US006330582B1

(12) United States Patent
Kuo et al.

(10) Patent No.: US 6,330,582 B1
(45) Date of Patent: Dec. 11, 2001

(54) APPARATUS AND METHOD ENABLING A CLIENT TO CONTROL TRANSACTION MESSAGE TRAFFIC BETWEEN SERVER AND CLIENT PROCESSES

(75) Inventors: Steve Tsanchun Kuo; Thomas Clarke Morrison; Hoang Minh Nguyen; Harry Otto Radke, all of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/215,438

(22) Filed: Mar. 21, 1994

(51) Int. Cl.$^7$ ....................................................... G06F 9/54
(52) U.S. Cl. .......................................... 709/101; 709/315
(58) Field of Search ............................ 395/700; 709/101, 709/315

(56) References Cited

U.S. PATENT DOCUMENTS

| | | | |
|---|---|---|---|
| 4,853,843 | * 8/1989 | Ecklund ................................ | 707/203 |
| 5,051,892 | 9/1991 | Ferree et al. .......................... | 710/105 |
| 5,095,421 | * 3/1992 | Freund ................................. | 709/107 |
| 5,115,392 | 5/1992 | Takamoto et al. .................... | 709/101 |
| 5,195,181 | 3/1993 | Bryant et al. ......................... | 709/215 |
| 5,249,293 | 9/1993 | Schreiber et al. .................... | 709/203 |
| 5,265,250 | 11/1993 | Andrade et al. ...................... | 709/101 |
| 5,396,630 | * 3/1995 | Banda et al. ......................... | 395/700 |
| 5,428,782 | * 6/1995 | White .................................. | 709/101 |
| 5,440,744 | * 8/1995 | Jacobson et al. ..................... | 395/650 |

OTHER PUBLICATIONS

Jim Gray, Transaction processing: concepts and techniques, 1993, pp. 259–347.
IBM Technical Bulletin "Network Deterministic Method of Routing Application Program Interfaces" vol. 36, No. 9B, 9/93, pp. 369–370.
IBM Technical Bulletin "Method for Forward Transitive Fully Connected Collection Management" 11/89, pp. 341–347.
IBM Technical Bulletin "Methodology for Serializing Asynchronous Network Requests Over Multiple Paths" No. 1, 1/93, pp. 151–156.
Rago, Stephen A., "UNIX® System V Network Programming", Addison–Wesley Publishing Co, pp. 456–459, 1993.*
"Accessing CICS/ESA Application From A Non–CICS Environment", IBM Technical Disclosure vol. 37, No. 02B, Feb. 1994.
European Search Report for EP 95 30 1835.

\* cited by examiner

*Primary Examiner*—St. John Courtenay, III
(74) *Attorney, Agent, or Firm*—Sawyer Law Group LLP (57) ABSTRACT

In a transaction processing system that includes a plurality of client processes coupled to a server process, the server process supports execution of transactions generated by the client processes. The server process includes, for each client process being served, one or more transaction message control mechanisms. Each transaction message control mechanism includes a named processing object that includes a name identifying the object. The named processing object also includes an input process that receives all transaction request messages naming the object and identifying the originating client process. The input process dispatches a transaction process for each transaction request message received from the respective client process. Each transaction process oversees transaction execution and receives transaction output. A transaction process provides a transaction output message for the originating client process. In a non-sync'd mode of operation, transaction processes may synchronously send transaction output messages to client processes. In a synchronized mode of operation, one transaction process at a time sends output messages under control of an output process in the named processing object. The transaction message control mechanisms provide a bi-directional transaction message flow between server and client processes.

34 Claims, 4 Drawing Sheets

APPARATUS AND METHOD ENABLING A CLIENT TO CONTROL TRANSACTION MESSAGE TRAFFIC BETWEEN SERVER AND CLIENT PROCESSES

BACKGROUND OF THE INVENTION

The invention relates to transaction processing, and more particularly to a transaction processing system of the client/server type in which a client process creates a mechanism in a server process that controls bi-directional transaction message traffic between the client and server processes.

A transaction has been defined as a logical unit of work by C. J. Date in his work, *INTRODUCTION TO DATABASE SYSTEMS*, Volume I (Addison-Wesley, September, 1985). Date particularly taught that a transaction in the database context consists of a sequence of operations by which a database is transformed from one consistent state to another consistent state. A transaction processing system guarantees that a transaction will either complete the transformation of a database into a new consistent state, or return the database to the consistent state at which the transaction began.

A particularly useful architecture for implementing transaction processing in distributed systems is the client/server model that is described in H. M. Deitel's *OPERATING SYSTEMS* (Addison-Wesley, 1990). In this model, clients denote service consumers in the form of client processes, while servers are processes that provide the services. In a typical database system that provides transaction-based access to a plurality of users, users enter database requests through client processes. The client processes engage the server process in the form of a database management system to service the user request according to a predetermined transaction protocol.

From the standpoint of client and server processes, transactions may be considered as "objects". As objects, transactions encompass the procedures and data necessary to satisfy a user request. As objects, transactions can be directly manipulated by clients and servers. The preferred mode of handling transaction objects is by messages that specify a particular type of manipulation. In this regard, a user request for reading records from a database may manipulate a transaction by specifying that the transaction must read the database and by providing parameters that establish where the reading is to take place, what records are to be read, etc. The transaction reports the outcome of the manipulation by returning a response message including the results of the operation.

Typically, objects are described by data structures that are referred to as "names". Current techniques of object-oriented programming recognize a "named processing object" as an object having a name and including one or more procedures.

A transaction message implies a source and a destination. A current database management system, such as the IMS product available from INTERNATIONAL BUSINESS MACHINES CORPORATION, distinguishes these end points by the use of logical terminals (LTERMs). An LTERM provides a queue where transaction output from the IMS product resides. Eventually, the IMS product makes the connection between the queue and a physical node that will receive the queued output. In the client/server model, the IMS product is considered the server process. Such database systems do not afford a client process with a mechanism to control transaction message flow by specifying the source and destination of a transaction message.

Viewed from another aspect, the LTERM capability of the IMS product provides a uni-directional (server-to-client) pipeline that can only be manipulated by the server. In this respect, an LTERM suggests the pipe structure used in UNIX® systems (UNIX® is a registered trademark of Novell, Inc.). Pipes may be objectified by names. They provide uni-directional, FIFO data transfer between processes and include the capability of interprocess synchronization. Two pipes oriented in opposite directions between client and server processes can provide bi-directional message flow, but entail two processing objects, only one of which can be manipulated by the client process.

Manifestly, the more time a server must spend in transaction message processing, the less efficient it will be in processing transactions. Accordingly, there is a need in transaction-based systems of the client/server type to provide a mechanism that will allow any client process to objectify a transaction and to manipulate the transaction object by messages in a bi-directional message pipeline.

SUMMARY OF THE INVENTION

The invention provides a mechanism that can be manipulated as an object by a client process to control bi-directional transaction message traffic between the client process and a server process. The invention allows a client process to name the mechanism as an object at a server process. The named object (also referred to as a "Tpipe") includes the ability to receive transaction request messages and transaction output messages at the server process and to associate transaction output messages with their ultimate destinations. Thus, the association between transaction output and its recipient is not made by a server process but is, rather, left to the client process.

The invention is embodied in both a mechanism and a procedure for bi-directional transport of transaction messages between server and client processes.

The invention affords flexibility to a transaction processing system of the client/server model in that many transaction outputs may simultaneously flow through the same Tpipe.

The invention allows a client process to create more than one Tpipe, thereby allowing distinctions to be made between transactions that occur naturally because of, for example, flow-control and synchronization differences.

The invention relieves the server process of responsibility for coupling a transaction output to an end user.

The invention provides client processes with control over the output of their submitted transactions.

DETAILED DESCRIPTION OF THE PREFERRED EMBODIMENT

Figure 1:
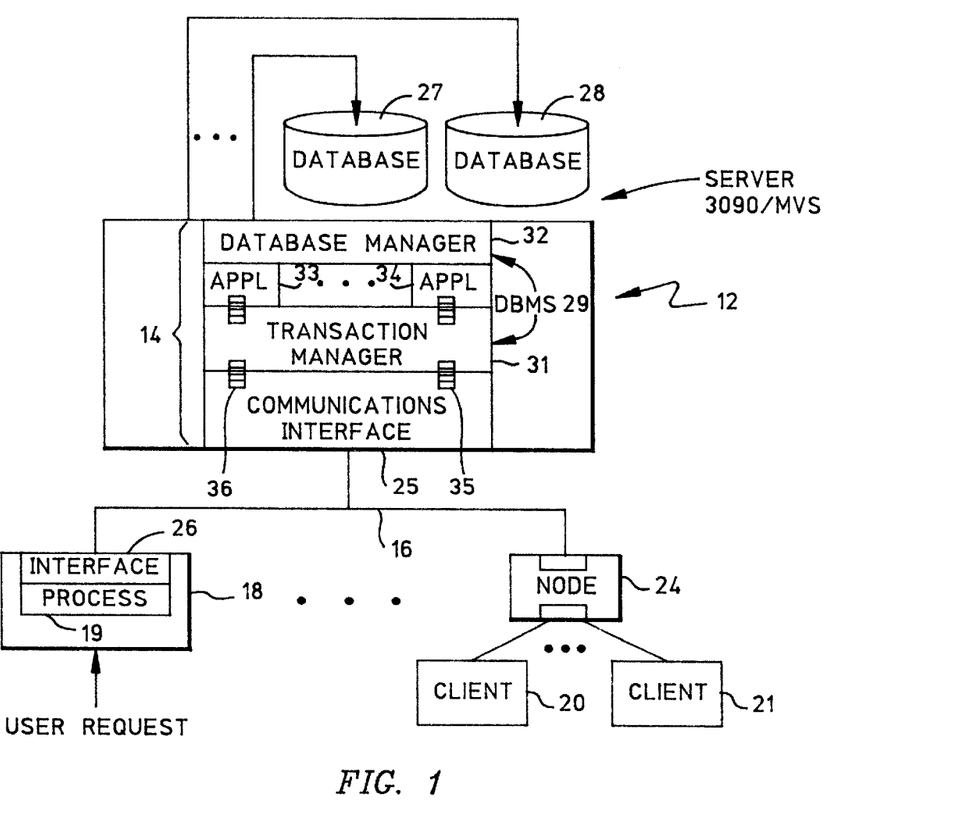
FIG. 1 is a block diagram with a transaction-based, client/server database system.

The invention concerns a transaction processing system of the client/server type. An exemplary embodiment of such a system is illustrated in FIG. 1. In FIG. 1, a central processor, which may include, for example, the 3090/MVS product available from INTERNATIONAL BUSINESS MACHINES CORPORATION, is indicated by reference numeral 12. A server process 14 executes in the central processor 12. In the preferred embodiment, the server process comprises a database management system such as the IMS product available from INTERNATIONAL BUSINESS MACHINES CORPORATION. The server process is coupled by a communications facility 16 to a peripheral processor 18 that executes a client process 19. Other peripheral processors 20, 21 may be coupled to the communication facility 16 by way of a node 24. The server and client processes 14 and 19 include respective communications interfaces 25 and 26 that implement an appropriate communication protocol to support transfer of information between the processes. Such architecture also characterizes communications between any client process and the server process 14. (In the invention, client processes may execute at virtually any transaction processing system location. Thus, a client process can be located at a peripheral processor 18, 20, 21, for example, at a node such as 24, and in the central processor 12).

The server process 14 supports transaction processing that affords client processes with the ability to access one or more databases such as the databases 27 and 28. The server process includes a database management system (DBMS) 29 that has at least a transaction manager 31 and a database manager 32. One or more application processes 33 and 34 execute to support user requests for database access. Thus, if a user access request is entered at the peripheral processor 18, the client process 19 executes, preparing a transaction request to implement the access requested by the user. The transaction request is sent via a message to the central processor 12 and delivered to the server process 14. Transaction requests are passed to the transaction manager 31 through an input queue 35. The transaction manager evaluates a transaction request, dispatches a transaction process to execute the request via one of the applications 33, 34. Output for transaction requests is queued at 36 and passed through the communications interface 25 and the communications facility 16 to the respective requesting client processes.

As will be appreciated by those skilled in the art, the client/server model of FIG. 1 is application specific in that it incorporates a structured communication facility which may comprise, for example, a network to interconnect client and server processes. The invention is not intended to be limited to such a structure. Indeed, the invention does not contemplate any specific communications control mechanization. It is concerned essentially with the control of message traffic between client processes and a server process, no matter where the processes are located.

Figure 2:
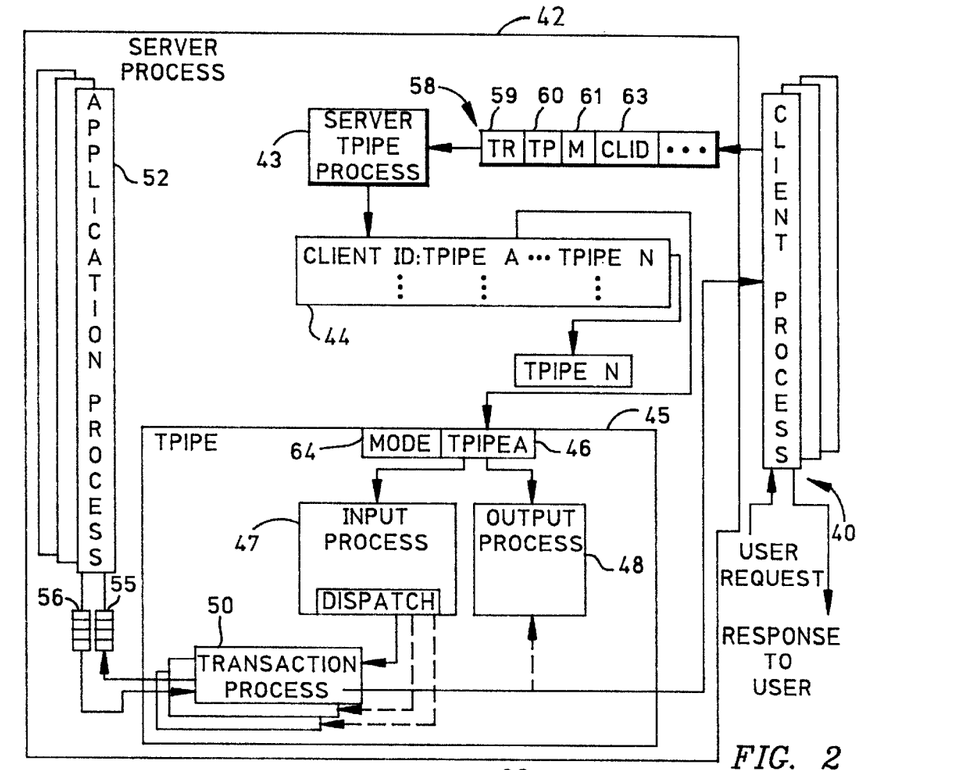
FIG. 2 is a block diagram illustrating the invention in a representative operational environment.

The invention is essentially illustrated in FIG. 2 in the context of a client process 40 in a plurality of client processes and a server process 42. The client process 40 receives user requests that it structures into transaction request messages and provides to the server process 42. The client and server processes 40 and 42 implement transaction processing according to a transaction protocol that may be selected according to implementation requirements.

The invention invests the client process 40 with the ability to control transaction message traffic through one or more transaction message control mechanisms ("Tpipes"). The Tpipes are named processing objects located in the server process 42. Each Tpipe data structure has an input process (PI) with associated queue (PIQ), an output process (PO) with associated queue (POQ), and a chain of dynamically created (and deleted, when done) transaction processes ((Tprocess) that are created and dispatched for processing transactions. Thus, each Tpipe is a data structure having a name that can be referred to in the interface between the client and server processes 40 and 42. The inventors contemplate that the Tpipes of the invention would be provided in a component of the server process 42 that corresponds essentially with a transaction manager.

In FIG. 2, a server Tpipe process 43 uses a hash structure 44 to access a Tpipe 45 having a data field 46 containing the name of the Tpipe (TpipeN), an input process 47, and an output process 48. The input process 47 includes the capability of dispatching transaction processes such as the transaction process 50. Each transaction process 50 that is dispatched by the input process 47 has the ability to parse and manipulate messages. A dispatched transaction process will forward a transaction request to the server process for execution. In this respect, the transaction process 50 includes logic for determining an application, such as the application 52, which will provide the processing to execute the transaction and which exchanges transaction data with the transaction process 50 by way of, for example, input and output queues 55 and 56. The transaction processes are also endowed with the ability to communicate transaction output and responses by message to client processes.

In operation, the client process 40 responds to a user request by assembling a message 58 having a plurality of fields. In a first message field 59, the message is denoted as a transaction message. The name of the Tpipe which is to receive and process the message 58 is specified in a field 60. A mode field 61 is provided in the message to indicate the mode of operation for the named Tpipe. A field 63 included in the message 58 containing routing information so that the transaction output can be routed to the originating client process.

Assume that the message field 60 names TpipeN. The server Tpipe process manager 43 will direct the message 58 to the input process 47 of TpipeN. The input process 47 will identify the type of transaction in the field 59, determine a mode of Tpipe operation in response to the field 61, set a mode flag 64, and dispatch a transaction process 50 for execution of the requested transaction. In dispatching the transaction process 50, the input process 47 passes to the transaction process the type of transaction and all data necessary to control transaction execution, and identifies the client process 40. Since the transaction process 50 is part of the named processing object 45, it references its activities to the processes in TpipeN. When the transaction is completed, the transaction process checks the mode flag 64. According to one setting of the mode flag 64, the transaction process constructs a message that is returned to the client process asynchronously with respect to any other transaction process dispatched by the input process 47. According to another mode setting, the transaction process 50 returns the transaction response to the client process under control of the output process 48, which synchronizes transaction output among all of the transaction processes dispatched by the input process 47.

According to the invention, every Tpipe named by the client process 40 is reserved for its exclusive use. Further, the client process may name more than one Tpipe in order to provide a variety of transaction message control modes that support particular modalities of transaction message processing. For example, a client process may reserve TpipeY for recoverable message processing, for which case TpipeY would be set to a synchronous mode of operation whereby transaction output is provided under the control of the output process of TpipeY. The same client process may set TpipeX to a non-asynchronous mode for use by transactions that do not require message recovery.

Figure 3:
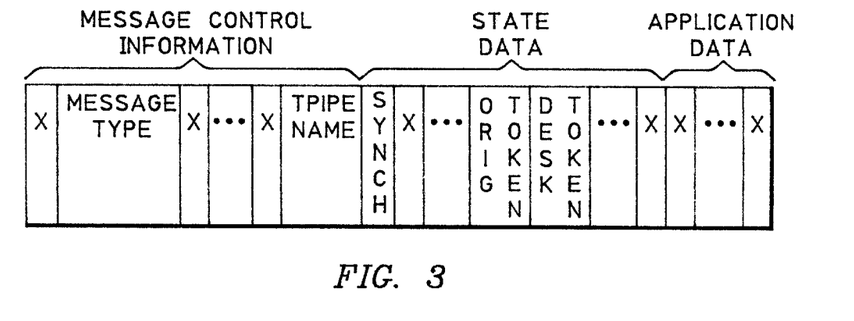
FIG. 3 illustrates the structure of a transaction message.

The format of messages transferred between the client and server processes according to the invention is illustrated in FIG. 3. Each message includes a multi-field structure in which successive sections include fields for message control information, transaction state data, and application process data.

The message control information section includes message type and Tpipe name fields. The message type field is used to indicate transaction input to the server process. The Tpipe name field names a Tpipe which will be responsible for controlling the message at the server process. The synch field in the state data section is used to set the mode flag at the named Tpipe. Preferably, the modes are referred to as Commit Modes, with Commit Mode 0 indicating that transaction response is to be committed at the server process before being sent to the client process. Commit Mode I permits a transaction response to be sent to the client process before it is committed at the server process. The state data section also provides token fields that denote the origination and destination of a message. The application data section names the transaction to be executed, which implies the application process that is to be used for transaction execution. This section also provides all of the data necessary to initiate the transaction.

Figure 4:
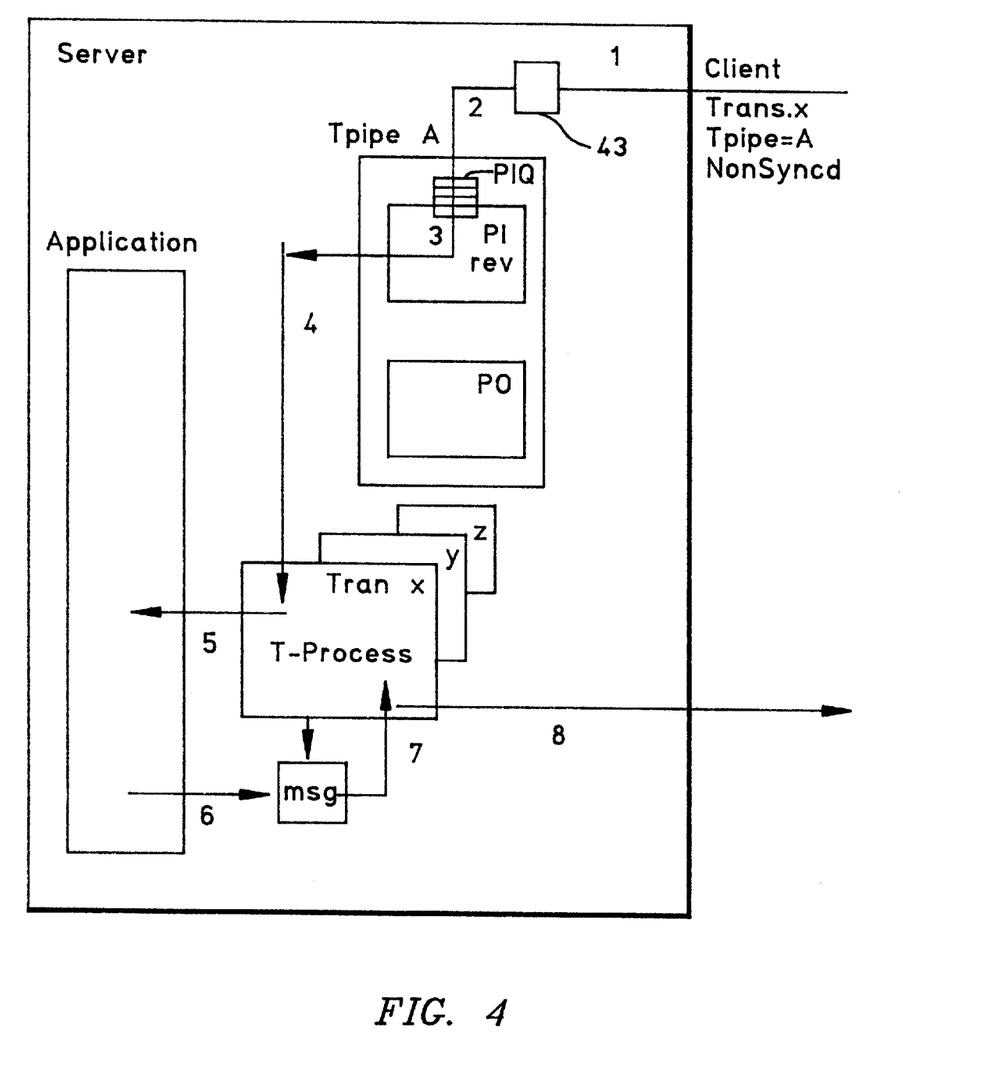
FIG. 4 is a hybrid block/flow diagram illustrating the operation of the invention according to a first mode.

With reference now to FIGS. 2 and 4 and to Tables I–III, the operation of the invention in Commit Mode I will be explained. Tables I–III are pseudo-code descriptions of logic for, respectively, the server Tpipe process 43, the Tpipe input process (PI), and a transaction process (Tprocess). The mode of operation for Commit Mode I is referred to as non-sync'd Tpipe. In the non-sync'd Tpipe mode of operation, all Tprocesses control the sending of the transaction response messages to the client process. Consequently, the output process (PO) is not used. The flow transactions and output through a non-sync'd Tpipe is illustrated in FIG. 4. The order and explanation of non-sync'd operation is as follows:

1. The client 40 sends a transaction message for transaction x as an input to the server process 42.
2. The transaction message is inspected by the server Tpipe process 43 whose logic is described in Table I. The server Tpipe process 43 verifies the presence of a Tpipe name in the message, consults the hash table 44 to determine whether the Tpipe has been named for the client process 40. If the name is not in the table, the Tpipe is created and its name is added to the hash table 44 for the client process 40. The transaction message is then enqueued to the input process ("PI") and Pi is scheduled to run.

Once a Tpipe has been created, it will remain linked by the hash table 44 to the client for which it was created for the life of the server process.

3. PI takes the transaction message from its queue and dynamically creates a Tprocess ("Tprocess x") for transaction x.
4. Tprocess x for transaction x is dispatched by PI to process the transaction.
5. Tprocess x submits the transaction to the named application 52 where it may be enqueued at 55.
6. The application 52 then provides through its output queue 56 a transaction output message to Tprocess x.
7. Tprocess x then takes the transaction output message and processes it as required for return to the client process 40.

8. Tprocess x then sends the transaction output message to the client processor 40. If more than one output message is required for transaction x, the output messages are enqueued on Tprocess x for transmission for the client process. Assuming that the client acknowledges messages, when all transaction output messages for transaction x have been acknowledged by the client, Tprocess x will be deleted.

Figure 5:
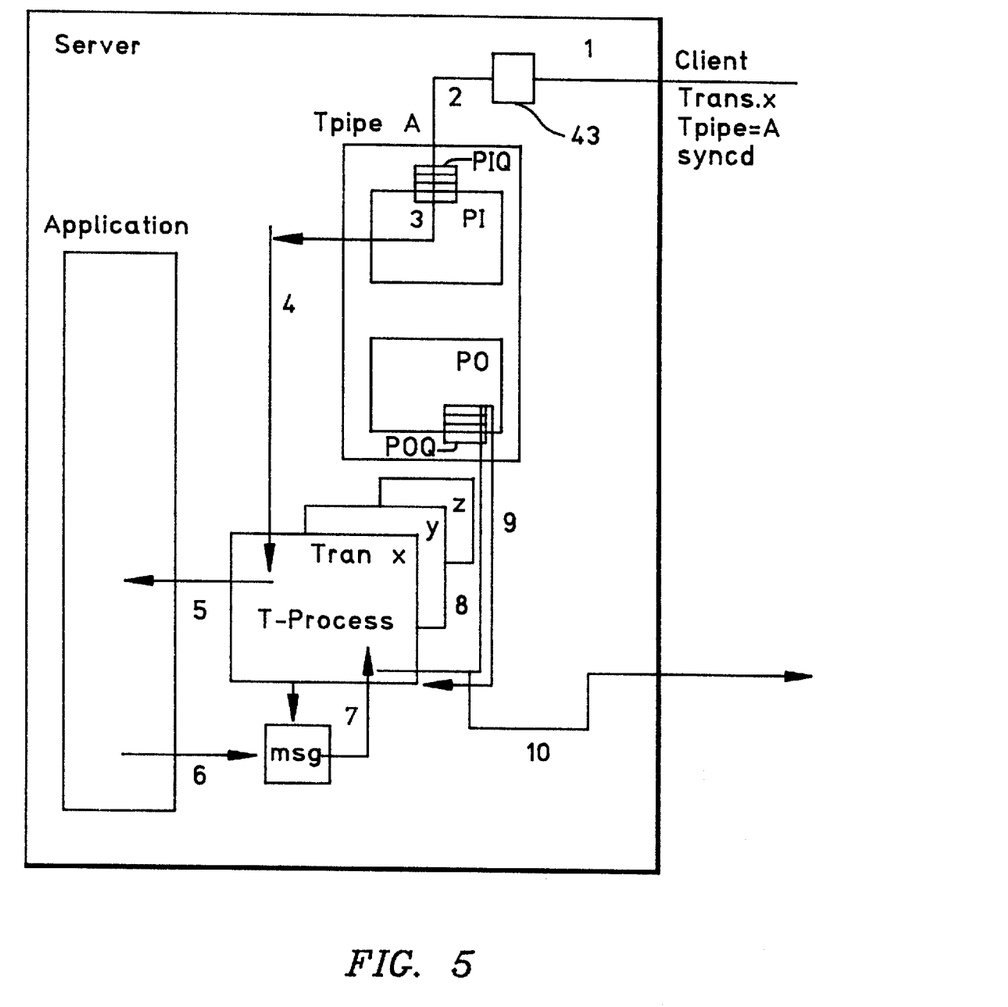
FIG. 5 is a hybrid block/flow diagram illustrating operation of the invention according to a second mode.

FIG. 5 illustrates message flow with a sync'd Tpipe operating in commit mode 0. In this regard, the invention contemplates a need for sync'd Tpipes in order to resynchronize processing if either the client process or the server process terminates abnormally.

For example, consider the scenario where a client process sends a transaction request message to the server process with a request for an acknowledgement. Assume that the transaction protocol requires the server to log the requested transaction and enqueue it prior to sending the acknowledgement to the client process. If the server process crashes before the acknowledgement is sent, both the client and server processes need to resynchronize by, for example, an exchange of sequence numbers. With resynchronization, the client process might assume that the transaction was not received by the server process, in which case the client process may attempt to send the transaction a second time. If the transaction is enqueued a second time at the server process, this may result in an unacceptable condition such as where the same debit is made twice to an account. In order to avoid this, the server process would, with reference to its log during resynchronization, inform the client process that the transaction was successfully received. In this case, the client would treat the information as an acknowledgement.

In the foregoing scenario, it would be necessary for the client and server processes each to maintain a copy of the last sent message and a record of the last received message in order to support resynchronization. This requires that all sending operations be properly serialized at the server process in that no message may be sent until an acknowledgement has been received for the previous sent message. Relatedly, all sent and received messages must be enqueued. This is accomplished in the invention by funneling all output messages through the output process in the sync'd mode of operation.

For a sync'd Tpipe, the output queue (POQ) that is controlled by the output process (PO) is used. Any Tprocess with a transaction output message in a sync'd mode Tpipe queues for permission from the output process. When the output process grants permission to a Tprocess, only that Tprocess is allowed to send transaction output messages to a client process.

The flow of transactions and output through a sync'd Tpipe is illustrated in FIG. 5 and described as follows:

1. The server Tpipe process receives a transaction request message containing transaction x.
2. The server Tpipe process notices that Tpipe A has been named for the transaction and attempts to locate that object. If not found, the object is dynamically created and entered into the hash table 44 for the requesting client process where it remains for the life of the server process.
3. The input process, PI, takes the transaction request message and dynamically creates a Tprocess for transaction x. This Tprocess is denoted as Tprocess x.
4. Tprocess x is created and dispatched by PI to process transaction x.
5. Tprocess x submits the transaction to the application process where it may be enqueued.

6. The application process then provides an output in a transaction response message to Tprocess x.

7. Tprocess x takes the transaction response message and formats it as required by the relevant communication protocol.

8. Tprocess x enqueues a request token on POQ.

9. PO for Tpipe A returns permission to Tprocess x.

Tprocess x is now the only Tprocess for Tpipe A who may send messages to the client process.

10. Tprocess x sends transaction output messages to the client process and notifies the PO for Tpipe A when message transmission is completed. Now, the PO for Tpipe A may grant permission to another Tprocess to begin sending transaction output messages. When all the transaction output messages for transaction x have been sent, Tprocess x is deleted.

The following tables present pseudo-code descriptions of the logic for the components shown in FIGS. 4 and 5. Table I illustrates the server Tpipe process that receives transaction request messages, verifies Tpipe identification, and directs messages that include client process transaction requests to appropriate Tpipes.

Table II illustrates the logic for a Tpipe input process (PI). Implicit in this logic the ability to identify acknowledgement (Ack) response from a client process in the sync'd mode of operation. As will be evident from inspection of Table II, the output process (PO) in the sync'd mode of operation signals when a Tprocess has sent an output message and is awaiting an acknowledgement. The logic also illustrates the ability of PI to create and change Tprocesses as necessary to service transaction requests for the client process.

The Tprocess logic for non-sync'd operation is illustrated in Table III. This logic synchronizes the Tprocess with an application for receipt of output messages and with the client process by way of acknowledgement of output messages.

Table IV gives the logic for a Tpipe output processor (PO), which functions essentially as an output service that must be output bid for by Tprocessors.

The logic for Tprocess in a sync'd Tpipe is given in Table V. In a sync'd Tpipe, a Tprocess logs transactions upon receiving them from the PI, retains the exclusive service of PO for all output messages generated for a transaction, and logs all output messages.

Figure 6:
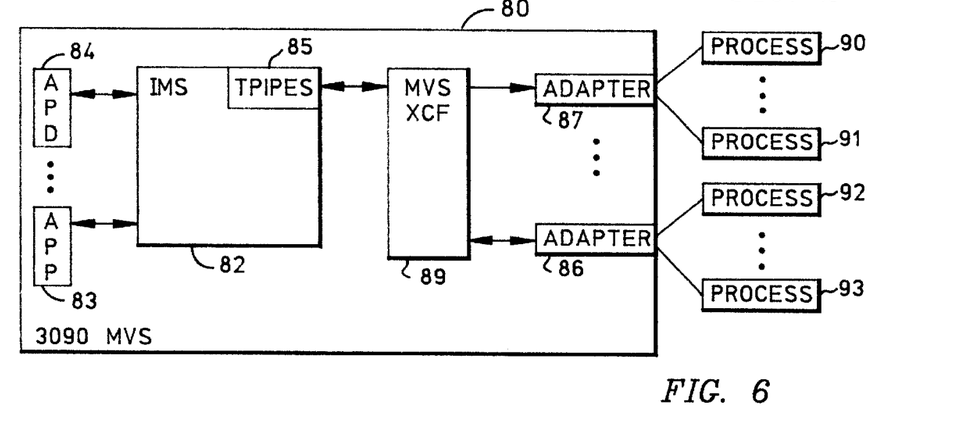
FIG. 6 is an illustration of the best mode of operating the invention.

FIG. 6 illustrates an industrial application incorporating the best mode of operation for the invention. In this application, a mainframe computer 80 in the form of a 3090/MVS system executes an IMS database access system 82 that is conventionally coupled to applications 83 and 84. The IMS system 82 operates as a server process and incorporates the Tpipes logic of the invention. The IMS system 82 is a server process that provides services to client processes in the form adaptors 86 and 87 that communicate with IMS system 82 by way of the MVS XCF interprocess communication facility 89. The MVS XCF product is available from INTERNATIONAL BUSINESS MACHINES CORPORATION and is described, for example, in the Application Development Guide: ADG Authorized Assembler Language Programs (publication GC 28-1645) published by INTERNATIONAL BUSINESS MACHINES CORPORATION. The adapters 86 and 87 are each connected to one or more processes 90–93 to afford users the ability to access one or more databases through IMS system 82. Such processes may be located in remote processing locations such as terminals and may also be located in the same processor as the server process.

TABLE I

Pseudocode for Server Tpipe Process 43, FIG. 2

Receive Client's transaction (via XCF or any other Transport mechanism).
Verify that Tpipe name is specified in the transaction.
Look up Tpipe name in hash table of Tpipes's.
If Tpipe does not exist then
    Create the Tpipe and add it to the Tpipes hash table.
Endif
Enqueue the transaction to the Tpipe's PI process and schedule that PI to run.
Wait for another transaction.

TABLE II

Pseudocode for Input Process 47, FIG. 2

Receive data on the input queue( PIQ).
If data is a transaction then
    If Sync'd Tpipe then
        if PO is waiting for an ACK then
            Reject the transaction.
            Go to WAIT logic.
        Endif
    Endif
    Create a Tprocess for the transaction and chain
    it to the list of existing Tprocesses for the Tpipe.
    Schedule the Tprocess to run.
Elseif data is an Ack from a Client then
    If Sync'd Tpipe then
        If PO is NOT waiting for an Ack then
            Reject the Ack.
            Go to WAIT logic.
        Else
            Notify the PO that its expected Ack has arrived.
            This will cause the PO to wake up and run.
            Go to WAIT logic.
        Endif
    Endif
    Locate the Tprocess who is awaiting the Ack and
    notify him that his expected Ack has arrived.
    This will cause the Tprocess to wake up and run.
Elseif data is a command then
    Process the command
Else
    Reject the data.
Endif
WAIT for more data on the PIQ.

TABLE III

Pseudocode for Tprocess in Non-Sync'd Mode

Initial processing: A transaction message has been received
    from the PI.
    Enqueue the transaction to the Server application.
LOOP: WAIT for a notification.
    Wake up as a result of a notification. Either the PI
    is giving an Ack, or a Server application
    is giving output message.
    If notification is for an Ack, then
        If another output message enqueued then
            Send the output message to the Client.
        Elseif no more expected output messages, then
            Delete yourself.
        Endif
    Elseif notification is for an application output message, then
        Send the output message to Client.
    Endif
    Go to LOOP to wait for Ack.

TABLE IV

Pseudocode for Output Process (PO) in Sync'd Mode

Receive Tprocess X's request on the POQ queue.
Mark PO as giving up control to Tprocess X.
Notify Tprocess X that he is now in control of output
processing. This will cause X to run.
Main Wait
If Tprocess relinquishes control of PO then
    Get next request on the POQ and go to beginning.
Elseif PI has given Ack to PO then
    Mark Tprocess as no longer waiting for an Ack.
    Notify Tprocess that his Ack has arrived.
    Go to Main Wait
Endif

TABLE V

Pseudocode for Tprocess in Sync'd Mode

Initial processing: A transcation has been received from the PI.
    Log the transaction. Include Client's transaction sequence number in the log record.
    Enqueue the transaction to the Server application.
LOOP: WAIT for a notification.
    Wake up as a result of a notification. Either the PI is giving an Ack, or a Server application is giving output message (when no other output message processing is taking place. I.e. if output message processing is in process, then the application will only enqueue the message to the Tprocessor)
    If notification is for an Ack, then
        If another output message enqueued then
            Send the output message to the Client.
        Elseif no more expected output messages, then
            Notify PO to relinquish control of output processing.
            Delete yourself.
        Endif
    Elseif notification is for an application output message, then
        Enqueue PO-control request to POQ and WAIT for PO to give us this control.
        Log output message with Tpipe's output sequence number.
        Send the output message to Client.
        Indicate in PO that he is now expecting an Ack.
    Endif
    Go to LOOP to wait for Ack.

While only certain preferred features of this invention have been shown by way of illustration, many changes and modifications will occur to those skilled in the art. Accordingly, it is to be understood that the appended claims are intended to cover all such modifications and changes as fall within the true spirit and scope of the invention.

What is claimed is:

1. In a transaction processing system that executes a plurality of client processes and a server means in the transaction processing system coupled through a communication facility to the plurality of client processes for executing client-initiated transactions, an apparatus for controlling transaction messages in the server means, the apparatus comprising:

means for creating a named processing object in the server means in response to a transaction request message received from a respective client process on the communication facility, the transaction request message including a field identifying the respective client process and a name identifying the named processing object;

an input process means included in the named processing object for receiving all transaction request messages from the respective client process that include the name identifying the named processing object; and dispatch means in the input process means for creating and dispatching a transaction process and for providing a transaction request message to the dispatched transaction process for processing a transaction requested by the transaction request message.

2. The apparatus of claim 1, wherein the transaction processes dispatched by the dispatch process provide transaction output messages for the respective client process.

3. The apparatus of claim 2, further including an output process means included in the named processing object for serializing provision of transaction output messages for the respective client process.

4. The apparatus of claim 3, wherein the output process means includes means for enabling one transaction process to provide a transaction output message for the respective client process while preventing all remaining transaction processes dispatched by the dispatch means from providing transaction output messages.

5. The apparatus of claim 3, wherein the output process means includes means for queueing transaction output messages.

6. A transaction processing system, including:

a plurality of client process means for generating transaction request messages, each transaction request message including a request to execute a transaction, a field identifying a respective client process means, and an object name;

a server process means for executing transaction requests contained in transaction request messages from the plurality of client process means;

an interprocess message exchange facility coupled to the plurality of client process means and to the server process means for providing client process transaction request messages to the server process means and providing transaction output messages to the client process means;

routing means in the server process means for routing transaction request messages according to processing object names contained in the transaction request messages; and a plurality of transaction message transport mechanisms in the server process means, each transaction message transport mechanism including:

a named processing object that includes an object name identifying the named processing object and an identification of a respective client process means;

an input process in the named processing object for receiving all transaction request messages that include the object name and the identification of the respective client process means; and dispatch means in the input process means for dispatching a transaction process means in response to a transaction request message, each transaction process means dispatched by the dispatch means being for receiving a transaction request message and for initiating a transaction for execution.

7. The system of claim 6, wherein the transaction process means dispatched by the dispatch means provide transaction output messages.

8. The apparatus of claim 7, the named processing object further including an output process means for serializing provision of transaction output messages for the respective client process means.

9. The apparatus of claim 8, wherein the output process means includes means for enabling one transaction process means to provide a transaction output message while preventing all remaining transaction process means dispatched by the dispatch means from providing transaction output messages.

10. The apparatus of claim 8, wherein the output process means includes means for queueing transaction output messages.

11. In a transaction processing system including a plurality of client processes and a server process coupled to the plurality of client processes for executing client-initiated transactions, a method for grouping transaction messages, the method comprising the steps of:

sending a transaction request message from a respective client process to the server process, the transaction request message including a field identifying the respective client process and an object name;

in the server process, creating a named processing object in response to the transaction request message, the named processing object including the object name and identifying the respective client process;

activating an input process in the named processing object;

providing all transaction request messages from the respective client that include the object name to the input process; and for each transaction request message received by the input process, dispatching a transaction process by providing the transaction request message to the transaction process for processing a transaction requested by the transaction request message.

12. The method of claim 11, wherein transaction processes dispatched by the input process provide transaction output messages for the respective client process.

13. The method of claim 11, further including the steps of:

activating an output process in the named processing object; and the output process serializing provision of transaction output messages for the respective client.

14. The method of claim 13, wherein the step of serializing includes the output process enabling one transaction process to provide a transaction output message for the respective client process while preventing all remaining transaction processes dispatched by the input process from providing transaction output messages for the respective client process.

15. The method of claim 13, wherein the step of serializing includes queueing transaction output messages.

16. A method of operating a transaction processing system including a plurality of client processes, a server process, a message exchange facility coupled to the plurality of client processes and to the server process, and a plurality of transaction message transport mechanisms in the server process, each transaction message transport mechanism including:

a named processing object that includes an object name identifying the transaction message transport mechanism and an identification of a respective client process;

an input process included in the named processing object; and means in the input process for dispatching processes; the method including the steps of:

generating transaction request messages in client processes of the plurality of client processes, each transaction request message including a request to execute a transaction, an object name, and an identification of a client process which generated the transaction request message;

providing transaction request messages from client processes to the server process through the message exchange facility;

in the server process, routing a transaction request message to a respective transaction message transport mechanism that is linked to a named processing object including a name contained in the message and a field identifying the originating client process; and in the respective transaction message transport mechanism, dispatching a transaction process for executing a request in the transaction request message.

17. The method of claim 16, wherein transaction processes dispatched by the transaction message transport mechanisms provide transaction output messages.

18. The method of claim 17, wherein said each transaction message transport mechanism further includes an output process in the named processing object, the method further including the step of, in said each transaction message transport mechanism, the output process serializing the provision of transaction output messages for the respective client process.

19. The method of claim 18, wherein the step of serializing includes enabling one transaction process to provide a transaction output message while preventing all remaining transaction processes dispatched by each transaction message transport mechanism from providing transaction output messages.

20. The apparatus of claim 18, wherein the step of serialing includes queueing transaction output messages.

21. A server apparatus for use in a transaction processing system, comprising:

a message facility for receiving transaction request messages from client processes;

means for creating a named processing object in response to a client process transaction request message, the transaction request message including a field identifying a respective client process and a name identifying the named processing object;

an input process means included in the named processing object and coupled to the message facility for receiving all transaction request messages from the respective client process that include the name identifying the named processing object; and dispatch means in the input process means for creating and dispatching a transaction process and for providing a transaction request message to the dispatched transaction process for processing a transaction requested by the transaction request message.

22. The server apparatus of claim 21, wherein the transaction processes dispatched by the dispatch means provide transaction output messages for the respective client process.

23. The server apparatus of claim 22, further including an output process means included in the named processing object for serializing provision of transaction output messages.

24. The server apparatus of claim 23, wherein the output process means includes means for enabling one transaction process to provide a transaction output message for the respective client means while preventing all remaining transaction processes dispatched by the dispatch means from providing transaction output messages.

25. The server apparatus of claim 23, wherein the output process means includes means for queueing transaction output messages.

26. In a server apparatus for use in a transaction processing system, the server apparatus having means for coupling to a plurality of client processes for executing client-initiated transactions, a method for grouping transaction messages, the method comprising the server apparatus-executed steps of:

receiving a transaction request message, the transaction request message including a field identifying a respective client process and an object name;

creating a named processing object in response to the transaction request message, the named processing object including the object name and identifying the respective client process;

activating an input process in the named processing object;

receiving a plurality of transaction request messages;

providing all transaction request messages in the plurality of transaction request messages that include the object named to the input process; and for each transaction request message received by the input process, dispatching a transaction process by providing the transaction request message to the transaction process for processing a transaction requested by the transaction request message.

27. The method of claim 26, wherein transaction processes dispatched by the input process provide transaction output messages for the respective client process.

28. The method of claim 26, further including the steps of:

activating an output process in the named processing object; and the output process serializing provision of transaction output messages for the respective client.

29. The method of claim 28, wherein the step of serializing includes the output process enabling one transaction process to provide a transaction output message for the respective client process while preventing all remaining transaction processes dispatched by the input process from providing transaction output messages for the respective client process.

30. The apparatus of claim 28, wherein the step of serializing includes queueing transaction output messages.

31. A client apparatus for use in a transaction processing system, including:

means for receiving a plurality of transaction requests;

means for generating transaction request messages addressed to a server process, each transaction request message being generated in response to a respective transaction request and including:
a first field identifying a requested transaction; and
a second field for naming a processing object in a server apparatus, the processing object including an
object name identifying a server transaction message processing mechanism and the client process;

means for receiving transaction output messages from a server process and associating each transaction output message with a transaction request of the plurality of transaction requests.

32. The client process of claim 31, wherein each transaction request message includes means for selecting a location for committing the transaction identified in the first field.

33. The client apparatus of claim 32, wherein the location is a server process.

34. The client process of claim 33, wherein the location is the client process.

* * * * *